(12) United States Patent
Beierl

(10) Patent No.: US 8,118,343 B2
(45) Date of Patent: Feb. 21, 2012

(54) STOWABLE ROOF CONFIGURATION FOR A CONVERTIBLE

(75) Inventor: Dominik Beierl, Korntal-Münchingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 297 days.

(21) Appl. No.: 12/100,843

(22) Filed: Apr. 10, 2008

(65) Prior Publication Data

US 2008/0277962 A1 Nov. 13, 2008

(30) Foreign Application Priority Data

May 12, 2007 (DE) .......................... 10 2007 022 354

(51) Int. Cl.
*B60J 7/14* (2006.01)
(52) U.S. Cl. .............. 296/107.09; 296/116; 296/107.15; 296/107.16
(58) Field of Classification Search .............. 296/116, 296/107.08, 107.15, 108, 107.16, 107.17, 296/107.09, 107.07
See application file for complete search history.

(56) References Cited

U.S. PATENT DOCUMENTS

| 6,422,637 | B1 | 7/2002 | Mac Farland | |
| 6,425,622 | B2 | 7/2002 | Eberle | |
| 6,637,802 | B2 | 10/2003 | Obendiek | |
| 7,607,715 | B2 * | 10/2009 | Beierl et al. | 296/108 |
| 2001/0019213 | A1 | 9/2001 | Eberle | |

FOREIGN PATENT DOCUMENTS

| CN | 1293123 A | 5/2001 |
| DE | 100 06 296 C1 | 5/2001 |
| DE | 101 16 094 C2 | 10/2002 |
| EP | 1092579 A1 | 4/2001 |
| JP | 2306822 A | 12/1990 |

OTHER PUBLICATIONS

German Patent and Trademark Office Search Report, dated Mar. 20, 2008.
Translation of Chinese Office Action dated Aug. 21, 2009.
European Search Report dated Mar. 23, 2010.

* cited by examiner

*Primary Examiner* — Glenn Dayoan
*Assistant Examiner* — Melissa A Black

(57) ABSTRACT

A stowable roof configuration for a convertible has a main link with at least two arms and is able to move about a main bearing and, a main roof element, which is connected to the main link by first joints. At least one additional roof element is disposed behind the main roof element in a closed position of the roof configuration and is connected to the main link by or in second joints. A connecting rod system is provided for connecting to the additional roof element. The connecting rod system and the additional roof element along with the main link form an at least five-member coupler mechanism, in which the second joints for the additional roof element lie between the main bearing and the first joints.

6 Claims, 2 Drawing Sheets

STOWABLE ROOF CONFIGURATION FOR A CONVERTIBLE

CROSS-REFERENCE TO RELATED APPLICATION

This application claims the priority, under 35 U.S.C. §119, of German application DE 10 2007 022 354.6, filed May 12, 2007; the prior application is herewith incorporated by reference in its entirety.

BACKGROUND OF THE INVENTION

Field of the Invention

The invention relates to a stowable roof configuration for a convertible. The roof configuration includes a main link having at least two arms and is able to move about a main bearing, a main roof element, which is connected to the main link in first joints, at least one additional roof element located behind the main roof element in a closing position of the roof configuration, and a connecting rod system for the additional roof element, connected to the main link in second joints.

A stowable roof configuration of this kind is known from German patent DE 100 06 296 C1, corresponding to U.S. Pat. No. 6,425,622. It contains a main link having a front and rear arms, which can move about a main bearing fixed to the car body for the closing and stowing away of the roof configuration. On the main link, at a distance from the main bearing, a main roof element is supported by first joints. If the roof configuration is in its closed position, in which it covers a space in the vehicle, an additional roof element is located behind the main roof element and is joined to the main roof element by second joints via a connecting rod system. The connecting rod system is configured as a four-joint system, which is furthermore connected to the front arm of the main link via a coupling arm to guide the motion of the additional roof element.

BRIEF SUMMARY OF THE INVENTION

It is accordingly an object of the invention to provide a stowable roof configuration for a convertible, which overcomes the above-mentioned disadvantages of the prior art devices of this general type, in which an additional roof element can be moved in a simple manner.

With the foregoing and other objects in view there is provided, in accordance with the invention, a stowable roof configuration for a convertible. The roof configuration contains a main bearing, a main link having at least two arms and able to move about the main bearing, first joints, a main roof element connected to the main link by the first joints, and second joints. At least one additional roof element is disposed behind the main roof element in a closed position of the roof configuration, the additional roof element is connected to the main link by the second joints. A connecting rod system connects to the additional roof element. The connecting rod system and the additional roof element along with the main link form an at least five-member coupler mechanism, in which the second joints for the additional roof element lie between the main bearing and the first joints.

The benefits primarily achieved with the invention are that a small number of additional gearing elements is needed to implement the inventive five-member coupler mechanism thanks to tying the additional roof element into the main link, since most of the gearing elements are formed by already present elements of the stowable roof configuration. Thus, the roof configuration can also be constructed in a simple and economical way. Moreover, the roof configuration has a secure operation, since fewer gearing elements are needed. Furthermore, the roof configuration, also known as a softtop, can start from a low stowing height.

Especially preferable is when the main link is formed by a simple four-joint mechanism, i.e., it contains a front and a rear arm, which are moved about the main bearing secured to the car body. Between the front arm and the additional roof element is disposed a gearing element of the coupler mechanism, so that the inventive five-element coupler mechanism is formed by the main bearing (joined stationary to the car body), the two arms of the main link, the gearing element and the additional roof element itself. Thus, the additional roof element in the preferred embodiment is connected with the rear arm directly in a joint.

According to a further modification of the invention, it is advantageous that the additional roof element can be supported by the main roof element in the closing position of the roof configuration.

Especially preferably, the invention is used in a roof configuration containing, besides the main roof element and the additional roof element, also a front roof element disposed in front of the main roof element. The front roof element forms a so-called roof peak and the main roof element and the additional roof element form contour segments for a canopy cover preferably provided for the roof configuration, so that the aforementioned softtop can be formed.

For a simplified control effort, the front roof element is tied into the main link for control purposes.

According to a further embodiment, it is advantageous that a continuous roof surface is provided, which can reach up to a preferably provided rear window, which is incorporated into a canopy material.

According to another embodiment of the invention, the rear window is incorporated into the canopy material at least in the closed position of the roof configuration. Preferably, there is a permanent incorporation of the rear window in the canopy material.

Other features which are considered as characteristic for the invention are set forth in the appended claims.

Although the invention is illustrated and described herein as embodied in a stowable roof configuration for a convertible, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
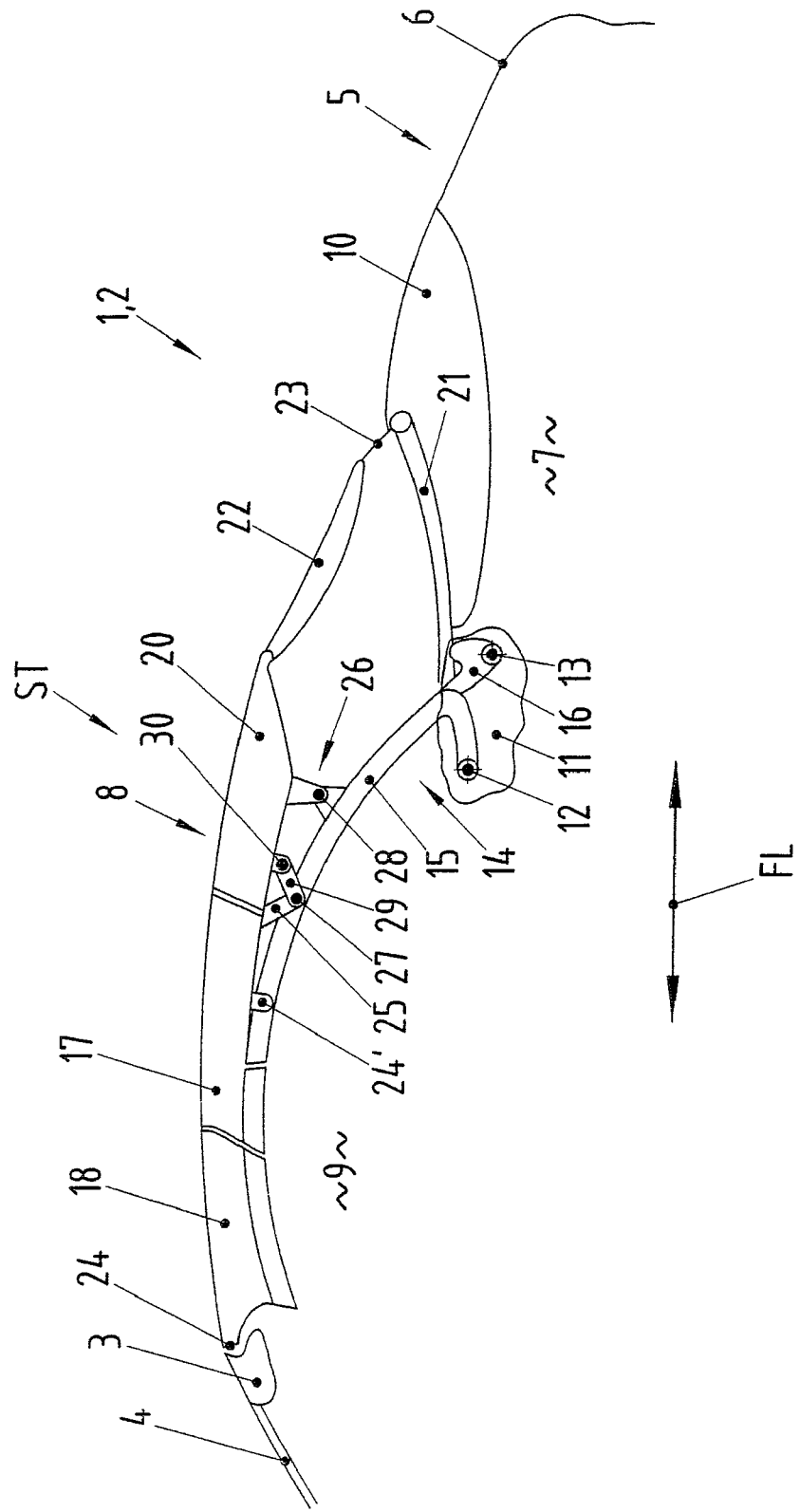
FIG. 1 is a diagrammatic, side-elevational view of a stowable roof configuration for a convertible in the closed position according to the invention.

Referring now to the figures of the drawing in detail and first, particularly, to FIG. 1 thereof, there is shown a cutout and longitudinal section of an open vehicle 1, also known as a convertible. Of its chassis 2, an upper segment 3 of a windshield frame is shown, containing a windshield 4. Moreover, one also sees a rear segment 5 of the chassis 2, containing a rear piece 6 forming the rear end. In the rear segment 5 there is formed a receiving box 7, in which a roof configuration 8 can be stowed from its closed position ST shown in FIG. 1, in order to open up a passenger space 9 situated underneath the roof configuration 8 in an open position of the roof configuration 8. In the closed position ST, the roof configuration 8 extends from the front segment 3 to the rear segment 5, which is also coordinated with a so-called canopy box cover 10, which can close or open the receiving box 7 in order to stow away the roof configuration 8 in the stowage box 7. Moreover, a so-called main bearing 11 is also disposed stationary on the chassis 2, which could also be termed the canopy bearing for the roof configuration.

Figure 2:
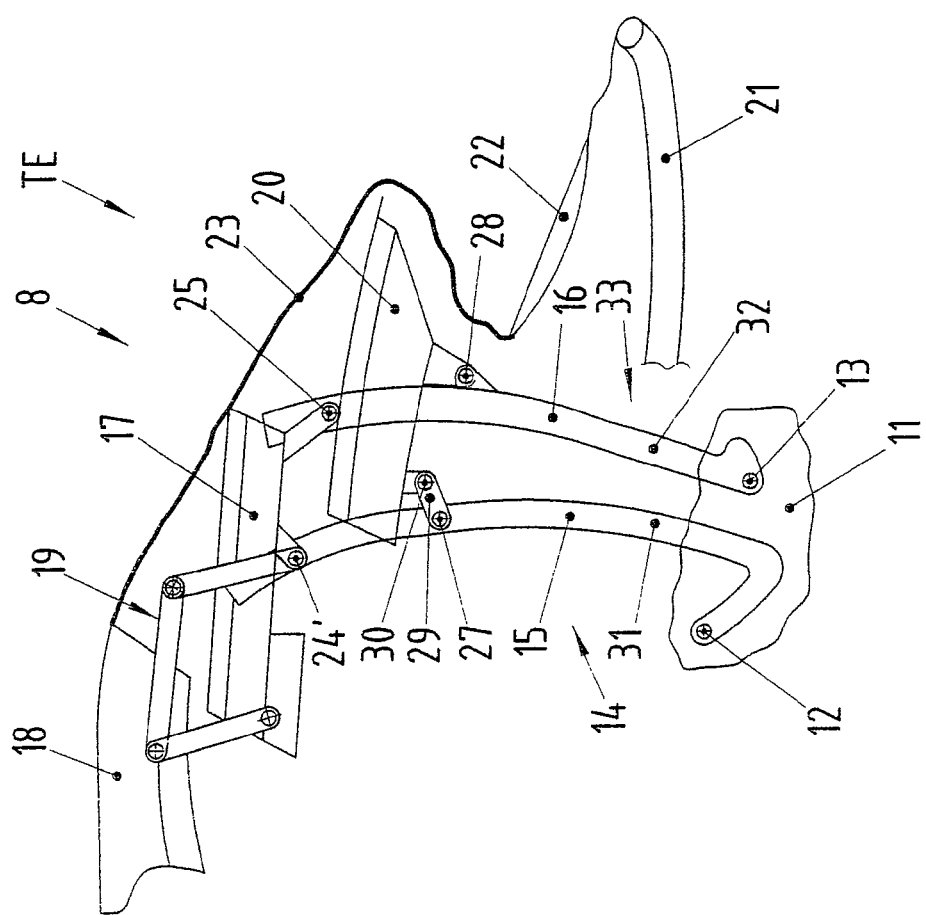
FIG. 2 is a diagrammatic, side-elevational view of the stowable roof configuration per FIG. 1 in a partially open position.

The stowable roof configuration 8 shall be explained more closely hereafter by FIGS. 1 and 2. On the main bearing 11, a main link 14 is secured in pivot bearings 12 and 13, having at least one front arm 15 and one rear arm 16, looking in a lengthwise direction FL of the vehicle, and worked upon by a drive unit, not shown here, for the moving of the roof configuration 8. The two arms 15 and 16 are preferably curved and bear a main roof element 17 approximately in the region of their free end. Mounted ahead of the main roof element 17, i.e., disposed in front of the main roof element 17 in the closed position ST, is a front roof element 18, which is tied into the controls for moving the main roof element 17 by way of a coupling rod system 19. Moreover, the roof configuration 8 has an additional roof element 20, which is disposed behind the main roof element 17 in the closed position ST. Between the additional roof element 20 and a fabric stretching bracket 21 of the roof configuration 8 forming the rear end, there is also provided a rear window 22, which is preferably permanently incorporated in a canopy fabric 23. The canopy fabric 23 extends preferably from a front peak 24 on the roof element 18 to the rear stretching bracket 21, as is especially evident in FIG. 2, which shows the roof configuration 8 in a partly open position TE.

In the region of the free ends of the arms 15 and 16, the main roof element 17 is connected to the main link 14 by first joints 24' and 25, which preferably form a pair of joints. Thus, the arms 15 and 16 and the main roof element 17 form a simple four-link system with the joints (pivot bearings) 12, 13, 24' and 25.

The additional roof element 20 is connected to the main link 14 via a connecting rod system 26, for which two joints 27 and 28 are provided, which can form a pair of joints and which are disposed between the first joints 24' and 25 and the pivot bearings 12 and 13 forming the lower joints. The connecting rod system 26 has at least one coupling arm 29, one end of which is connected to the additional roof element 20 at the second joint 27, while its other end is connected at another or third joint 30. Thus, lower segments 31 and 32 of the two arms 15 and 16, the coupling arm 29 and the additional roof element 20 form linkage elements of a five-member coupler mechanism 33 for the additional roof element 20, if the main bearing 11 as a stationary frame is counted as the fifth member of the linkage. The additional roof element 20 is connected to the arm 16 at its rear end directly via the joint 28, for which there can be provided an extension on both parts, which are then connected together at the joint 28. At its front end, the additional roof element 20 is connected to the coupling arm 29.

FIG. 1 further shows that the front roof element 18, the main roof element 17 and the additional roof element 20 form continuous contour segments for the canopy cover 23 lying in a row, i.e., they impress the outer form or roof contour on the canopy cover 23 in the closed position ST. Thus, the roof elements 17 and 20 form roof hoops having a corresponding length in the lengthwise direction FL of the vehicle. The three roof elements 17, 18 and 20 adjoin each other and lie in a row in the closed position ST, so that at least the additional roof element 20 can rest against the main roof element 17 in the closed position ST, thereby producing a defined position for the additional roof element 20.

The invention claimed is:

1. A stowable roof configuration for a convertible, comprising:
   a main bearing;
   a main link having at least two arms and able to move about said main bearing;
   first joints;
   a main roof element connected to said main link by said first joints;
   second joints directly connected to said main link;
   at least one additional roof element disposed behind said main roof element in a closed position of the roof configuration, said additional roof element connected to said main link by said second joints; and
   a connecting rod system only connected between said additional roof element and said main link, said connecting rod system and said additional roof element along with said main link forming an at least five-member coupler mechanism, in which said second joints for said additional roof element lie between said main bearing and said first joints.

2. The roof configuration according to claim 1, wherein:
   said at least two arms of said main link include a front arm and a rear arm;
   said five-member coupler mechanism has a coupling arm, between said front arm and said additional roof element is disposed said coupling arm; and
   said additional roof element is connected with said rear arm directly by one of said second joints.

3. The roof configuration according to claim 1, wherein said main roof element and said additional roof element lie against each other in the closed position of the roof configuration.

4. The roof configuration according to claim 1, further comprising a front roof element disposed in front of said main roof element in the closed position of the roof configuration.

5. The roof configuration according to claim 4, wherein said front roof element is tied into said main link for control purposes.

6. The roof configuration according to claim 4, wherein said front roof element, said main roof element and said additional roof element lie in a row with each other in the closed position of the roof configuration.

* * * * *